(12) United States Patent
Kawai

(10) Patent No.: US 8,678,122 B2
(45) Date of Patent: Mar. 25, 2014

(54) VEHICLE BODY FRAME OF MOTORCYCLE

(75) Inventor: Hideaki Kawai, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 27 days.

(21) Appl. No.: 13/327,451

(22) Filed: Dec. 15, 2011

(65) Prior Publication Data

US 2012/0161417 A1     Jun. 28, 2012

(30) Foreign Application Priority Data

Dec. 24, 2010   (JP) ................................. 2010-288913

(51) Int. Cl.
*B62K 11/06*   (2006.01)

(52) U.S. Cl.
USPC ........................................ 180/219; 280/281.1

(58) Field of Classification Search
USPC ................................ 180/219, 225; 280/281.1
See application file for complete search history.

(56) References Cited

U.S. PATENT DOCUMENTS

| | | | |
|---|---|---|---|
| 4,691,800 A | 9/1987 | Kadono et al. | |
| 6,679,347 B2 * | 1/2004 | Iimuro | 180/219 |
| 6,837,328 B2 * | 1/2005 | Neugebauer et al. | 180/225 |
| 7,270,210 B2 * | 9/2007 | Katsura | 180/219 |
| 7,296,814 B2 * | 11/2007 | Miyamoto | 280/281.1 |
| 7,644,796 B2 * | 1/2010 | Taniguchi | 180/219 |
| 7,699,132 B2 * | 4/2010 | Adachi et al. | 180/219 |
| 7,841,625 B2 * | 11/2010 | Gruber et al. | 280/835 |
| 7,849,947 B2 * | 12/2010 | Morita | 180/219 |
| 7,934,738 B2 * | 5/2011 | Prielinger et al. | 280/274 |
| 2006/0169511 A1 | 8/2006 | Kurokawa et al. | |
| 2006/0197304 A1 * | 9/2006 | Ishikawa et al. | 280/281.1 |

FOREIGN PATENT DOCUMENTS

| | | |
|---|---|---|
| CN | 1336309 A | 2/2002 |
| CN | 101654134 A | 2/2010 |
| EP | 1698548 A1 | 9/2006 |
| EP | 2159143 A1 | 3/2010 |
| GB | 151032 A | 9/1920 |
| JP | 2006281890 A | 10/2006 |
| JP | 2009-292350 A | 12/2009 |
| JP | 2010023730 | 2/2010 |
| JP | 2010-058763 A | 3/2010 |
| WO | 2006109484 A1 | 10/2006 |

OTHER PUBLICATIONS

Kawai, Hideaki, "Motorcycle," U.S. Appl. No. 13/327,434, filed Dec. 15, 2011, 39 pages.

(Continued)

*Primary Examiner* — Kevin Hurley
*Assistant Examiner* — Michael Stabley
(74) *Attorney, Agent, or Firm* — Alleman Hall McCoy Russell & Tuttle LLP

(57) ABSTRACT

A vehicle body frame of a motorcycle comprises a front frame portion extending rearward from a head pipe; and a rear frame portion extending downward or rearward from a rear end of the front frame portion. The front frame portion includes at least a pair of right and left frame members. A forward portion of the rear frame portion is a lumbar frame having a closed cross-section structure portion in which a pair of right and left steel plates and are joined together. Devices such as a canister, and an ABS unit, are easily mounted in spaces lateral relative to the lumbar frame having a reduced width, while ensuring a sufficient stiffness.

1 Claim, 10 Drawing Sheets

(56) References Cited

OTHER PUBLICATIONS

Kawai, Hideaki, "Vehicle Body Frame of Motorcycle," U.S. Appl. No. 13/329,100, filed Dec. 16, 2011, 39 pages.
European Patent Office, Extended European Search Report of EP11193721.5, Apr. 23, 2012, Germany, 6 pages.
European Patent Office, Extended European Search Report of EP11193709.0, Apr. 2, 2012, Germany, 6 pages.
European Patent Office, Extended European Search Report of EP 11193665.4. Apr. 5, 2012, Germany, 6 pages.
Patent Office of the People's Republic of China, Office Action of Chinese Patent Application No. 201110431928.1, Apr. 24, 2013, China, 8 pages.
State Intellectual Property Office of China, Office Action and Search Report of Chinese Patent Application No. 201110431928.1, Aug. 9, 2013, 8 pages.

* cited by examiner

VEHICLE BODY FRAME OF MOTORCYCLE

BACKGROUND OF THE INVENTION

1. Field of the Invention

The present invention relates to a vehicle body frame of a motorcycle. Particularly, the present invention relates to a structure of a rear frame portion to which devices incorporated into the motorcycle, such as an ABS unit, a canister, and a battery, are mounted.

2. Description of the Related Art

Conventionally, in a vehicle body frame of a motorcycle, typically, a pivot frame extending downward and a rear frame extending rearward such that it is tilted in an upward direction are coupled to a rear end of a main frame extending rearward and obliquely downward from a head pipe. A front wheel is mounted to the head pipe via a front fork. A rear wheel is mounted to the pivot frame via a swing arm. The main frame, which receives a force applied by the front and rear wheels, is required to have proper flexibility, i.e., a proper bending stiffness and a proper twisting stiffness.

Typically, an engine and a transmission are laid out below the main frame. The main frame is composed of a pair of right and left main frame members which are spaced apart from each other to provide a good balance between the bending stiffness and the twisting stiffness. For example, Japanese Laid-Open Patent Application Publication No. 2010-058763 discloses a motorcycle in which a pipe frame is composed of a pair of right and left pipes extending from a head pipe to a location near a rear end portion of a vehicle body, and a cross pipe coupling them together in a suitable location. Engine hanger members are formed in forward portions of the right and left pipes, respectively, and support a front portion of the engine at right and left sides.

Rear arm brackets are welded to the right and left pipes of the pipe frame, respectively, such that the rear arm brackets extend downward from substantially center portions of the right and left pipes in the forward and rearward direction. The rear arm brackets support front ends of the rear arms (swing arms), respectively. Further, backstays extend rearward and obliquely upward from portions of the right and left rear arm brackets, respectively. Rear ends of the backstays are welded to rear ends of the pipe frame, respectively. That is, in this example, a front portion of the pipe frame is the main frame, and a rear portion of the pipe frame constitutes a rear frame along with the backstays.

In recent years, to improve safety, to meet emission regulation, etc., devices incorporated into a motorcycle, for example, an ABS unit, a GPS unit, and a canister of an evaporative fuel, have been increasing in number. Therefore, attention has been paid to a space in which these devices are laid out. For example, Japanese Laid-Open Patent Application Publication No. 2009-292350 discloses a mounting structure for laying out an ABS unit between and slightly behind right and left rear arm brackets, in a motorcycle including a pipe frame similar to the pipe frame disclosed in the patent application stated above.

However, in a case where the ABS unit is laid out near the right and left rear arm brackets as in the latter conventional example, pipes, stays, and others constituting a vehicle body frame, such as the right and left pipes of the pipe frame, the rear arm brackets, a cross pipe, and backstays, surround the ABS unit from above and from the right and left sides. Therefore, it is very difficult to mount the ABS unit to the vehicle body.

To be specific, when the ABS unit is laid out in a space between the pipes and others surrounding the ABS unit, and bolts and nuts are tightened, interference with the surrounding pipes and others tends to occur. In addition, when a brake pipe is attached to the ABS unit mounted in this way, interference with the pipes and others is unavoidable. Furthermore, since a metal-made pipe must be drawn to outside the pipes and the like of the frame, its length tends to be great, assembling work becomes difficult and inefficient, and manufacturing costs increases.

Since the plurality of pipes and the like are combined three-dimensionally to provide a stiffness to the overall frame, it is very difficult to modify the layout of the pipes to widen the mounting space for the devices. Thus, in principle, it is necessary to ensure the mounting space between determined pipe works. If the pipes and the like are provided with a dented portion or a hollow portion to avoid interference with the devices, their stiffness may possibly decrease significantly due to a concentration of stress, and as a result, drivability and stability may possibly degrade.

In general, a dimension of the space between determined pipe works does not conform to an outer dimension of the device. When the device is laid out in this space, wasted space tends to increase. With an increase in the number of devices, vehicle width will inevitably increase. If this happens near a seat, a rider cannot fit leg portions to the seat suitably, cannot attain unity with the motorcycle sufficiently, cannot ride the motorcycle comfortably, and cannot rest feet on the ground comfortably. If the devices are laid out in other places, for example, outside of the right and left rear arm brackets, the vehicle width will increase to excess, which is not practical.

SUMMARY OF THE INVENTION

The present invention addresses the above conditions, and an object of the present invention is to provide a vehicle body frame having a structure which allows a mounting space of devices to be provided easily and which makes a mounting work easier and more efficient, in a motorcycle. To achieve this objective, a vehicle body frame of a motorcycle of the present invention comprises a front frame portion extending rearward from a head pipe and a rear frame portion extending rearward from a rear end of the front frame portion, wherein the front frame portion includes a pair of right and left frame members and a forward portion of the rear frame portion includes a closed cross-section structure portion including right and left plate members joined together in a rightward and leftward direction.

In accordance with the vehicle body frame having the above configuration, since the forward portion of the rear frame portion includes the closed cross-section structure portion including the plate members joined together in the rightward and leftward direction, a width of the forward portion of the rear frame portion in the rightward and leftward direction can be reduced while ensuring stiffness, and devices such as an ABS unit, a GPS unit, and a canister can be laid out in spaces lateral relative to the reduced-width portion. The stiffness of the closed cross-section structure portion can be adjusted so that a sufficient stiffness is attained, by adjusting a thickness of the plate members in addition to its cross-sectional area, or its cross-sectional shape, or by providing a rib inside thereof. Therefore, a vehicle width does not increase regardless of the presence of the spaces on the right and left sides of the reduced-width portion in which the devices are laid out. The devices laid out in these spaces are less likely to interfere with a rider straddling the motorcycle.

Since the devices are mounted to the vehicle body frame in the spaces on the right and left sides of the closed cross-section structure portion, from laterally, the frame will not interfere with a mounting work of the devices. If the plate members of the closed cross-section structure portion are provided with mount seats, and bolts and nuts are welded thereto, tightening of the bolts and the nuts to fasten the devices to the vehicle body frame is performed easily.

In the vehicle body frame of the motorcycle of the present invention, the front frame portion to which an engine and a transmission are mounted is constituted by the right and left plate members, while the forward portion of the rear frame portion continuous with the front frame portion has the closed cross-section structure portion including the right and left plate members joined together in the rightward and leftward direction. Therefore, the width of the forward portion of the rear frame portion in the rightward and leftward direction can be reduced while ensuring a sufficient stiffness. As a result, the mounting space for the devices can be easily provided in regions lateral relative to the reduced-width portion, and a mounting work of these devices can be easily carried out.

In the front frame portion, a proper distance is set between the pair of right and left frame members, to provide a good balance between a bending stiffness and a twisting stiffness, like the conventional vehicle body frame. In addition, the width of the closed cross-section structure portion in the rightward and leftward direction is smaller than a distance between rear end portions of the right and left frame members.

The above and further objects, features and advantages of the invention will more fully be apparent from the following detailed description with reference to the accompanying drawings.

DETAILED DESCRIPTION OF THE PREFERRED EMBODIMENTS

Figure 1:
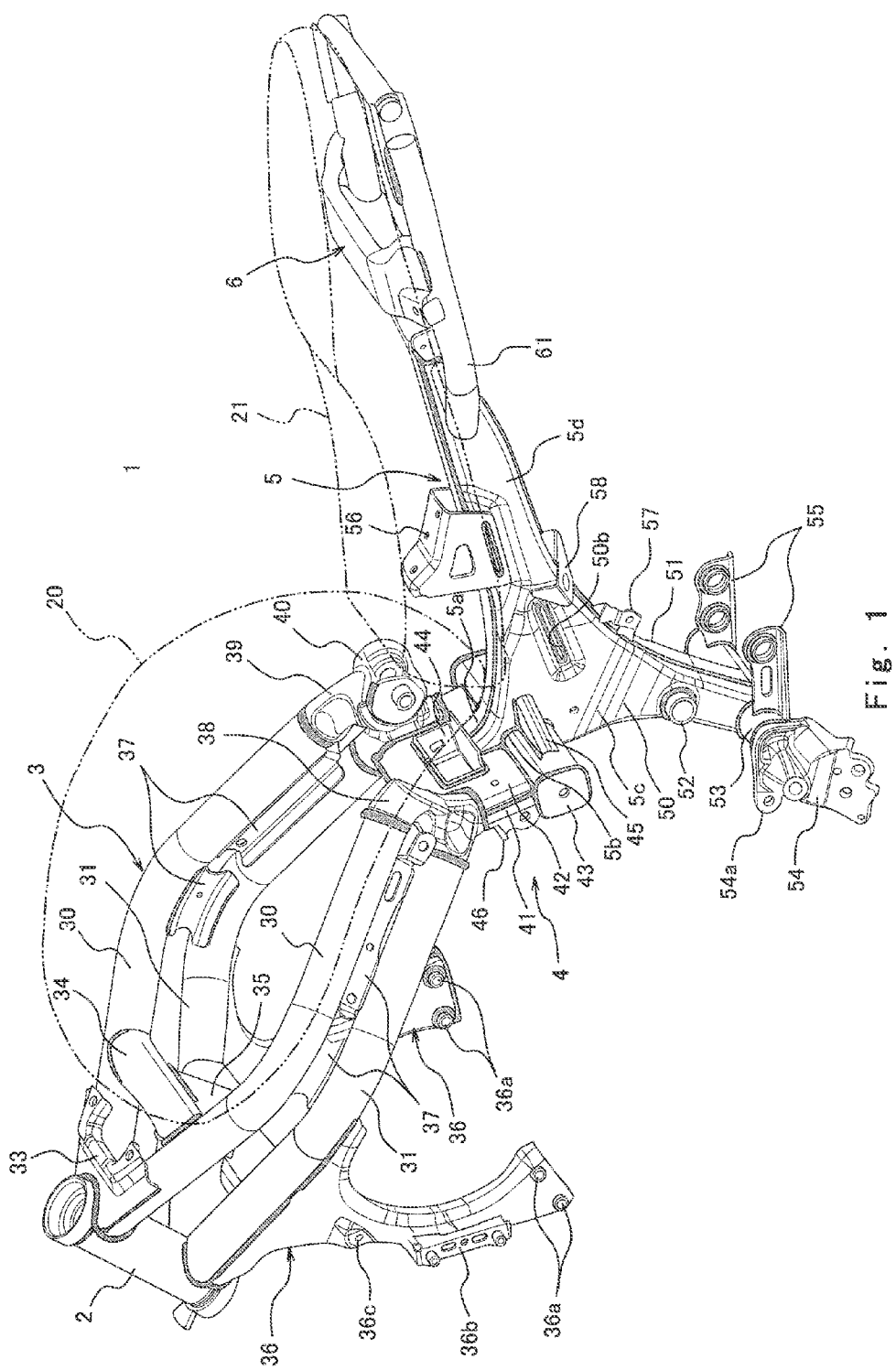
FIG. 1 is a perspective view showing an overall vehicle body frame of a motorcycle according to an embodiment of the present invention.
Figure 2:
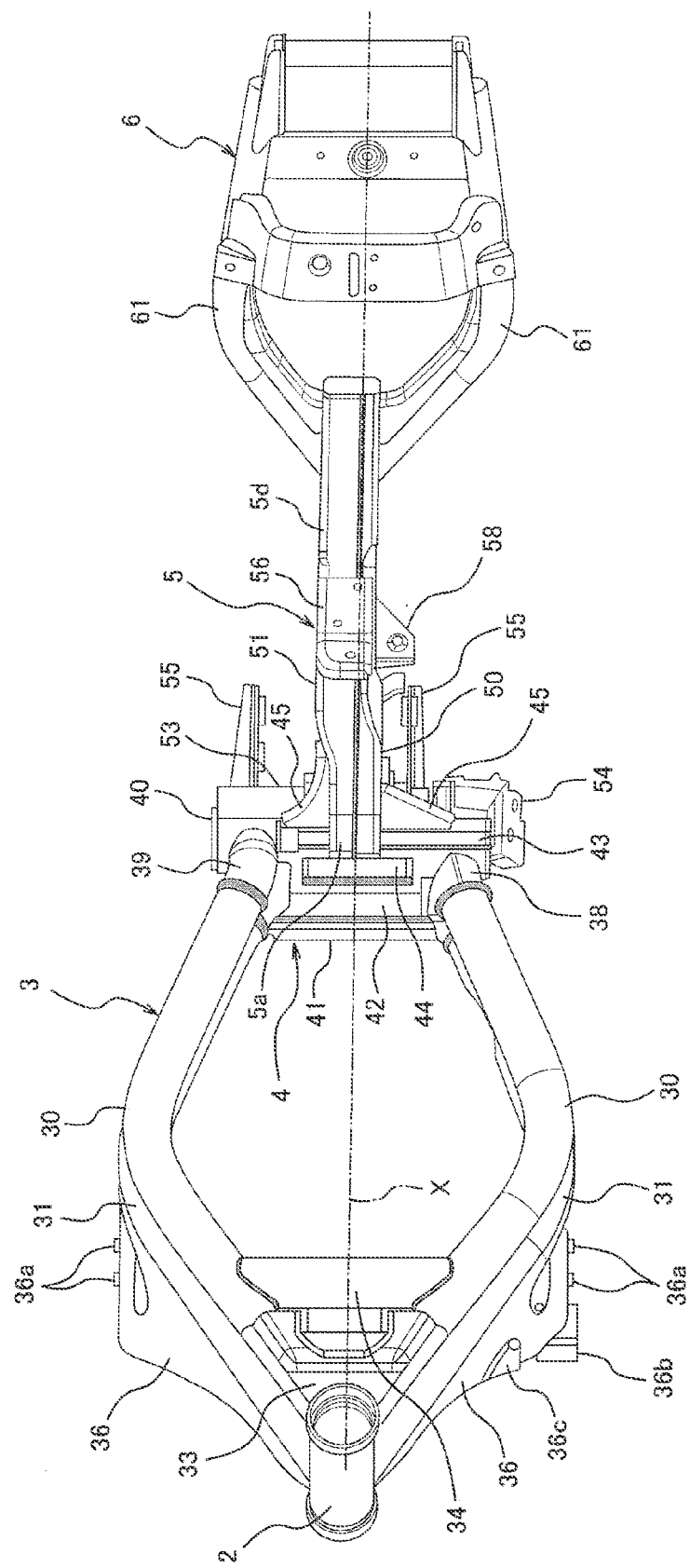
FIG. 2 is a plan view showing the overall vehicle body frame when viewed from above.

Now, a vehicle body frame of a motorcycle according to an embodiment of the present invention will be described with reference to the drawings. FIG. 1 is a perspective view showing an overall vehicle body frame 1. FIG. 2 is a plan view showing the overall vehicle body frame 1 when viewed from above. The stated directions are referenced from the perspective of a rider straddling the motorcycle.

As shown in FIGS. 1 and 2, the vehicle body frame 1 of the motorcycle includes a head pipe 2 and a main frame 3 extending rearward from the head pipe 2 such that the main frame 3 is tilted in a slightly downward direction. The main frame 3 includes right and left frame members which are two members extending rearward from the head pipe 2. In this example, each of the right and left frame members includes two round pipes (hereinafter referred to as an upper main pipe 30 and a lower main pipe 31) arranged in a vertical direction. Rear ends of the right and left frame members are coupled together by means of a center cross member 4 (cross member) having a tubular shape with a rectangular cross-section and a small thickness. The rear ends of the right and left frame members are coupled to a lumbar frame 5 in a rear frame portion via the center cross member 4.

The main frame 3 is a backbone frame of a vehicle body. The right and left frame members are laid out with a certain distance between them, adaptively to an engine (not shown) positioned therebelow so that a good balance is easily attained between a bending stiffness and a twisting stiffness. The lumbar frame 5 is coupled to a rear end of the main frame 3 via the center cross member 4 and supports a swing arm 22 (see FIG. 10) of a rear wheel, and constitutes, together with the center cross member 4, for example, a lower back (lumbar) part of the backbone frame, and for this reason will be referred to herein in this specification as the "lumbar frame 5". As will be described in detail later, the lumbar frame 5 is composed of two steel plates 50 and 51 which are press-formed and joined together from a right side and a left side, and has a closed cross-section structure with a high stiffness.

As schematically indicated by an imaginary line in FIG. 1, a fuel tank 20 is positioned above the main frame 3. A rear end portion of the fuel tank 20 extends rearward and downward and overlaps with a front end portion of the lumbar frame 5. Behind the fuel tank 20, a seat 21 for two persons which is straddled by a rider or a tandem rider (not shown) is provided.

—Structure of Front Frame Portion—

A structure of a front frame portion including the head pipe 2, the main frame 3 and the center cross member 4 will be described. The head pipe 2 located in a forefront portion of the front frame portion is tilted in a rearward direction to allow a front wheel to have a desired caster angle. An upper portion of a front fork is coupled to a steering shaft inserted into the head pipe 2 via a pair of upper and lower brackets, although this is not shown. That is, the head pipe 2 constitutes a steering shaft of the front wheel of the motorcycle.

Front end portions of the upper main pipes 30 of the main frame 3 are welded to an upper portion of the head pipe 2. Front end portions of the lower main frame pipes 31 of the main frame 3 are welded to a lower portion of the head pipe 2. As can be seen from FIG. 2, the main pipes 30 extend rearward such that a distance between them in a rightward and leftward direction increases gradually, are curved inward in substantially center portions thereof, and then extend rearward such that a distance between them in the rightward leftward direction decreases gradually. The main pipes 31 extend rearward such that a distance between them in the rightward and leftward direction increases gradually, are curved inward in substantially center portions thereof, and then extend rearward such that a distance between them in the rightward leftward direction decreases gradually. A V-shaped gadget 33 extending from an outer periphery of the upper portion 30 of the head pipe 2 is joined to and welded to the front end portions of the upper main pipes such that the gadget 33 covers them from above. The gadget 33 is joined to and welded to the front end portions of the upper main pipes 30. A cross pipe 34 is positioned behind and adjacently to the gadget 33. The cross pipe 34 is provided between and coupled to the right and left upper main pipes 30.

Likewise, the cross pipe 34 is provided between and coupled to the right and left lower main pipes 31. A pillar 35 having a rectangular cross-section is provided to couple a center portion of the lower cross pipe 34 to a center portion of the upper cross pipe 34. In other words, the upper and lower cross pipes 34 and the pillar 35 coupling the upper and lower cross pipes 34 together reinforce a relatively front portion of the main frame 3 in which the distance between the right and left frame members (main pipes 30 and main pipes 31) in the rightward and leftward direction increases gradually in the rearward direction.

In the forward portion of the main frame 3, which is reinforced to have a higher stiffness, down frames 36 extend downward from the right and left lower main pipes 31, respectively. The down frames 36 in entirety have a T-shape. Insertion holes 36a of bolts fastened to a case of the engine are formed in a lower end portion of a downwardly extending portion of each of the down frames 36. An upper edge portion of each of the down frames 36, which extends in a substantially forward and rearward direction, is joined to a front portion of the corresponding lower main pipe 31 and is welded thereto linearly. This makes welding work easier and provides an excellent external appearance of a welded portion, as compared to a case where the down frame 36 is welded to an entire outer periphery of the lower main pipe 31, which is a round pipe.

In this example, like the lumbar frame 5, the down frame 36 is composed of two steel plates which are press-formed and joined together from the right side and a left side, and has a closed cross-section structure. The down frame 36 can be manufactured at lower cost and can ensure a sufficient stiffness as compared to a down frame composed of a plurality of pipes combined together. Since the cross-section of the lumbar frame 5 has a rectangular shape elongated in the forward and rearward direction, it can have a smaller width when viewed from a front, while ensuring a desired stiffness, which does not impede a flow of cooling air in a rearward direction. This has an advantage that a cooling capability of the engine is enhanced.

Each of the down frames 36 is provided on an outer surface with a mount seat 36b of a cowl (not shown) and a mount seat 36c of a radiator (not shown). The mount seats are formed integrally with the outer steel plate when the outer steel plate is press-formed, and nuts are welded to reverse surfaces thereof to allow the cowl and the radiator to be easily mounted thereto. In that case, if the mount seat is dented to conform in shape to a device such as the radiator, an increase in a vehicle width can be suppressed. This fitting structure of the dented portion and the corresponding protruding portion has an advantage that a stiffness of the frame is enhanced.

Furthermore, plate-shaped brackets 37 are provided to couple the upper and lower pipes 30 and 31 of the right frame member (main pipes 30 and 31) of the main frame 3 together. These plate-shaped brackets 37 are respectively provided at corner portions of the right frame member from which the right frame member is curved inward, and relatively rear portions of the right frame member behind the corner portions, the relatively rear portions having a shape in which a distance in the rightward and leftward direction, with respect to corresponding rear portions of the left frame member, decreases in a rearward direction. Also, plate-shaped brackets 37 are provided to couple the upper and lower pipes 30 and 31 of the left frame member (main pipes 30 and 31) of the main frame 3 together. These plate-shaped brackets 37 are respectively provided at corner portions of the left frame member from which the left frame member is curved inward, and a relatively rear portion of the left frame member behind the corner portions, the relatively rear portion having a shape in which a distance in the rightward and leftward direction, with respect to a corresponding rear portion of the right frame member, decreases in a rearward direction.

Figure 3:
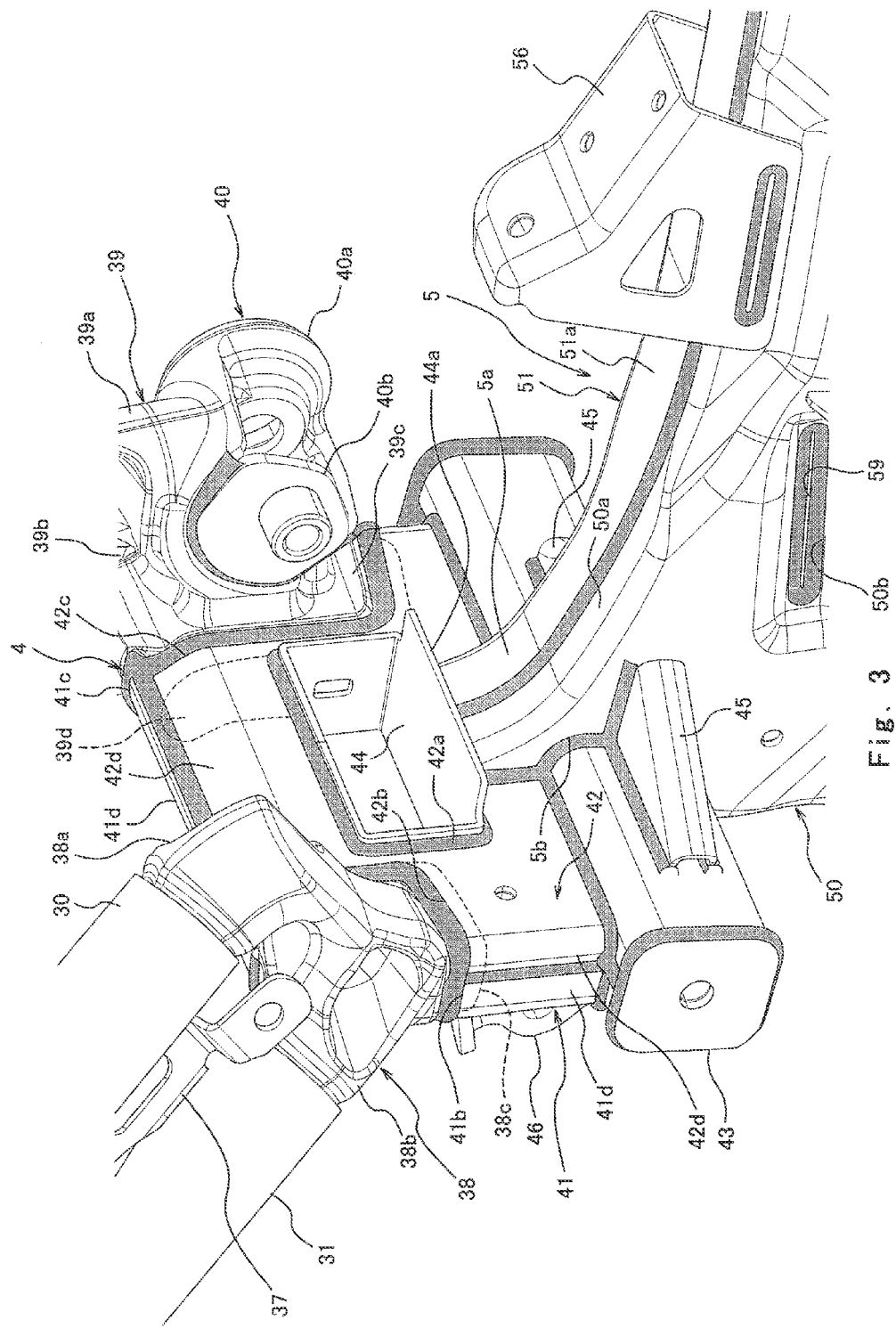
FIG. 3 is an enlarged perspective view showing a region surrounding a center cross member.
Figure 4:
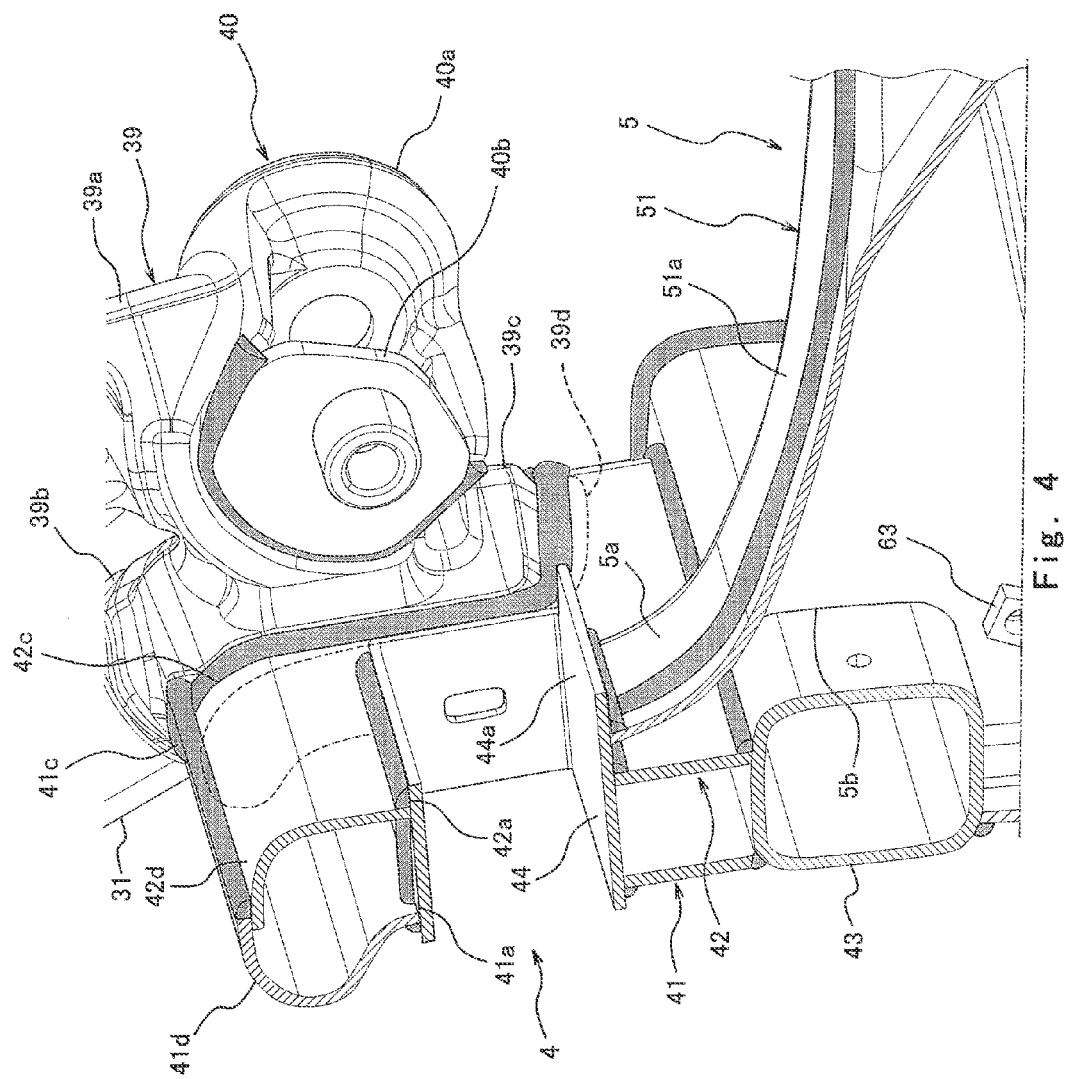
FIG. 4 is a perspective view showing a cross-section of a structure for joining the center cross member to a lumbar frame.

Rear ends of the upper and lower main pipes 30 and 31 are integrally coupled by joint members 38 and 39. Furthermore, the rear ends of the main pipes 30 and the main pipes 31 are further coupled together by means of the center cross member 4, as shown in FIGS. 3 and 4. As shown in FIG. 3, the left joint member 38 depicted at a near side in FIG. 3 has a structure in which two end members 38a and 38b having a substantially cylindrical shape and having tapered fit-in portions at their tip ends are arranged at upper and lower sides and their base end portions are connected together. The fit-in portions of the end members 38a and 38b are fitted into the rear ends of the upper and lower main pipes 30 and 31, respectively, and are welded to an entire periphery of the main pipe 30 and an entire periphery of the main pipe 31, respectively.

The right joint member 39 depicted at a far side in FIG. 3 couples upper and lower end members 39a and 39b together, as with the left joint member 38. A suspension support portion 40 is integrally provided to extend from a location of a rear side of the upper end member 39a to an obliquely downward location. Furthermore, the right joint member 39 has a substantially cylindrical extending portion 39c extending from a location of a rear side of the lower end member 39b to the suspension support portion 40. The suspension support portion 40 includes a pair of right and left ring-shaped support plates 40a and 40b. The right support plate 40a is integral with the upper end member 39a of the joint member 39. The left support plate 40b is separate from the right support plate 40a such that the left support plate 40a is a predetermined distance apart from the right support plate 40b.

As can be seen from FIG. 3, a recess is provided to open leftward, i.e., outward in the vehicle width direction, at a base end side of the lower end member 38b of the left joint member 38. A recess is provided to open rightward, i.e., inward in the vehicle width direction, at a base end side of the upper end member 38a, although this is not shown. In the same manner, a recess is provided to open rightward, i.e., outward in the vehicle width direction, at a base end side of the lower end member 39b of the right joint member 39, while a recess is provided to open leftward, i.e., inward in the vehicle width direction, at a base end side of the upper end member 39a.

—Center Cross Member—

The center cross member 4 couples the left joint member 38 and the right joint member 39 together at the rear end of the main frame 3. As described below, the center cross member 4 is configured in such a manner that two press-formed steel plates 41 and 42 are joined together in the forward and rearward direction, and a thick square pipe 43 (pipe member) is welded to a lower edge of the joined plates to form a closed cross-section structure having a small thickness in the forward and rearward direction. Because of this structure, the center cross member 4 is able to have a high stiffness, and achieve space saving as compared to the pipe work. As a result, the fuel tank 20 and the devices can be laid out flexibly in the vicinity of the center cross member 4.

To be specific, the center cross member 4 is placed to be tilted in a slightly forward direction. The joint members 38 and 39 are welded to left and right sides of an upper portion of the center cross member 4, respectively, while a front portion of the lumbar frame 5 is welded to a substantially center portion of a rear surface of a lower portion of the center cross member 4. In this layout, since a rear end of the fuel tank 20 can be extended downward to a space from a location above the center cross member 4 to a location rearward or obliquely rearward relative to the center cross member 4, the fuel tank 20 is able to be increased in volume. In addition, since pipes, stays, and the like, which constitute the vehicle body frame 1, are not present in this space, mounting work of the devices such as a canister 7 can be performed easily, as described later.

To be more specific, as indicated by a broken line in FIG. 3, the left joint member 38 and the right joint member 39 are provided with a swelling portion 38c and a swelling portion 39d, respectively. The swelling portions 38c and 39d are welded to the front and rear steel plates 41 and 42 of the center cross member 4 in a fitting state such that each is sandwiched between the front and rear steel plates 41 and 42. The swelling portion 38c of the left joint member 38 swells from the lower end member 38b rightward, i.e., inward in the vehicle width direction toward the joint member 39, and extends to an underside of the lower end member 38b. Thus, the swelling portion 38c has a substantially J-shape.

The swelling portion 39d of the right joint member 39 swells from the lower end member 39b to an obliquely downwardly extended portion 39c, leftward i.e., inward in the vehicle width direction toward the joint member 38, and extends to an underside of the extended portion 39c. Thus, the swelling portion 39d has a J-shape longer than that of the swelling portion 38c of the left joint member 38.

The front steel plate 41 of the center cross member 4 basically has a substantially rectangular shape which is laterally elongated and has a rectangular hole 41a (shown only in FIG. 4) in a center portion thereof. The rear steel plate 42 of the center cross member 4 basically has a substantially rectangular shape which is laterally elongated and has a rectangular hole 42a in a center portion thereof. The front steel plate 41 is provided with hollow portions 41b and 41c and the rear steel plate 42 is provided with hollow portions 42b and 42c on their right and left upper corner portions, to conform in shape to the end members 38b and 39b of the left and right joint members 38 and 39 and the extended portion 39c of the right joint member 39. A flange 41d is provided on an upper edge and right and left edges of the front steel plate 41 except for the hollow portions such that the flange 41d is bent rearward. A flange 42d is provided on an upper edge and right and left edges of the rear steel plate 42 except for the hollow portions such that the flange 42d is bent forward.

In the illustrated example, an outer dimension of the front steel plate 41 is greater than an outer dimension of the rear steel plate 42. As can be seen from FIG. 4, in a state where the front steel plate 41 and the rear steel plate 42 are joined together in the forward and rearward direction, the flange 41d of the front steel plate 41 is joined to the flange 42d of the rear steel plate 42 from outside. In this state, a periphery of the outer flange 42d is welded substantially linearly to an outer peripheral surface of the inner flange 41d. Welded portions of the flanges 41d and 42d have a double structure and improve stiffness. In addition, welding material melts well in the welded portions and the external appearance of the welded portions is excellent. Unlike in a case where pipes are welded, the flanges 41d and 42d can be welded together linearly, and therefore welding work is easy.

In a state where the front steel plate 41 and the rear steel plate 42 are joined together and coupled unitarily, and the hollow portions 41b and 42b of left upper corners of the steel plates 41 and 42 are unitarily coupled together to form an opening, the swelling portion 38c of the left joint member 38 is fitted into the opening. In the same manner, in a state where the front steel plate 41 and the rear steel plate 42 are unitarily joined together, and the hollow portions 41c and 42c of right upper corners of the steel plates 41 and 42 joined together in the forward and rearward direction are integrally coupled together to form an opening, the swelling portion 39d of the right joint member 39 is fitted into the opening. In this way, the swelling portion 38c is fitted into the opening of the left upper portion of the front and rear steel plates 41 and 42 joined together, the swelling portion 39d is fitted into the opening of the right upper portion of the front and rear steel plates 41 and 42 joined together, and the swelling portions 38c and 39d are welded to peripheries of the openings, respectively.

No flange is provided on lower edges of the front and rear steel plates 41 and 42. The lower edges of the front and rear steel plates 41 and 42 are joined and welded to an upper surface of the square pipe 43. The square pipe 43 has a greater thickness and a higher stiffness than the steel plates 41 and 42. Since the square pipe 43 is provided along the lower edges of the front and rear steel plates 41 and 42, a stiffness of the center cross member 4 is enhanced. Moreover, a reinforcement tube 44 (reinforcement member) conforming in outer shape to the rectangular holes 41a and 42a, which are the openings in the center portions of the front and rear steel plates 41 and 42, respectively, is inserted into the rectangular holes 41a and 42a. The reinforcement tube 44 penetrates the center cross member 4 in the forward and rearward direction and is welded to the center cross member 4.

The reinforcement tube 44 has a tubular shape having a rectangular cross-section and a small thickness, which is formed by bending a band-shaped steel plate in its lengthwise direction. In the illustrated example, lengthwise, both ends of the steel plates are abutted with each other and welded together in a center portion of an upper wall of the reinforcement tube 44. By addition of the reinforcement tube 44, the stiffness of the center cross member 4 can be further enhanced. However, the outer dimension of the center cross member 4 remains unchanged, and therefore, the layout of the fuel tank 20 and the like and the mounting work of the devices are not negatively affected.

In brief, the reinforcement tube 44 serves to reinforce the center cross member 4. However, the reinforcement tube 44 does not protrude outward from the center cross member 4 and does not interfere with components in the vicinity of the reinforcement tube 44, when these components are laid out. In addition, as described later, a harness or the like is inserted into the reinforcement tube 44 and hence penetrates the center cross member 4. Thus, a layout of electric components and a length of the harness can be optimized. A protruding portion 44a extending rearward (toward the near side in the Figure) is provided on a lower wall of the reinforcement tube 44. As described later, an upward protruding portion 5a of a front edge of the lumbar frame 5 is welded to the protruding portion 44a.

A detailed structure of the lumbar frame 5 will be described later. As can be seen from FIGS. 3 and 4, the lumbar frame 5 is welded to a lower portion of the center cross member 4 such that the lumbar frame 5 orthogonally crosses the square pipe 43 when viewed from behind. A substantially C-shaped hollow portion 5b is provided in an upper portion of a front edge of the lumbar frame 5 to conform in shape from a rear surface of the rear steel plate 42 of the center cross member 4 to the square pipe 43 connected to the underside of the steel plate 42. The hollow portion 5b is joined to the square pipe 43 and to the rear surface of the steel plate 42.

To be more specific, an upper surface of the lumbar frame 5 extends upward in a forward direction. The lumbar frame 5 has the upward protruding portion 5a protruding upward with an acute angle when viewed from a side. A front edge of the upward protruding portion 5a is an upper end portion of a front edge of the lumbar frame 5. As can be seen from FIGS. 3 and 4, the front edge of the upward protruding portion 5a is joined to the rear surface of the rear steel plate 42 of the center cross member 4. The hollow portion 5b is continuous with an underside of the upward protruding portion 5a and extends from the upper surface of the square pipe 43, through the rear surface of the square pipe 43, and further to an underside of the square pipe 43, and retains the square pipe 43 from upper and lower sides.

Thus, the square pipe 43 of the center cross member 4 is retained by and welded to the hollow portion 5b of the front edge of the lumbar frame 5. In addition, the upward protruding portion 5a extending upward from the hollow portion 5b is welded in a state where it is retained between the upper surface of the square pipe 43 of the cross member 4 and the protruding portion 44a of the reinforcement tube 44 provided above the square pipe 43. That is, the center cross member 4 and the lumbar frame 5 are welded together in a state where they are firmly fitted to each other by their concave-convex shape.

Furthermore, between the square pipe 43 and the lumbar frame 5 joined together in a cross shape as described above, wedge-shaped brackets 45 are provided from the rear surface of the square pipe 43 to right and left side surfaces of the lumbar frame 5 behind the square pipe 43. The wedge-shaped brackets 45 are reinforcement plates having a double-walled structure and each has a right triangle shape formed by bending a steel plate in the vertical direction. Each of right angle portions of the brackets 45 is welded to a corner portion defined by the rear surface of the square pipe 43 and the front edge of the lumbar frame 5. This can prevent the lumbar frame 5 from being displaced in a rightward and leftward direction with respect to the rear surface of the center cross member 4. As a result, a more firmly joined state between the lumbar frame 5 and the center cross member 4 is attained.

As can be seen from FIGS. 8 and 9 as described below, in addition to FIGS. 1 and 3, plate-shaped engine brackets 46 and 47 (see FIG. 9 for engine bracket 47) extending forward from the front steel plate 41 to the square pipe 43 are provided on left and right portions of a lower portion of a front surface of the center cross member 4, respectively. The engine brackets 46 and 47 are fastened at right and left sides to an engine crankcase (not shown) and a transmission case (not shown) integral with the crankcase.

As described above, in the present embodiment, the center cross member 4 having the closed cross-section structure with a small thickness in the forward and rearward direction couples the right and left frame members of the main frame 3 together, and couples them to the lumbar frame 5 behind the right and left frame members. Therefore, a stiffness equal to or higher than a stiffness achieved by a general and conventional pipe work is attainable while achieving space saving. As a result, the fuel tank 20 and the devices can be laid out more flexibly.

For example, the rear end portion of the fuel tank 20 can be positioned in a location rearward and below relative to a rear end portion of a fuel tank in a conventional layout, in a space above the center cross member 4. The layout of the fuel tank 20 is not interfered by a cross pipe extending in the rightward and leftward direction, etc. The devices such as the canister 7 and the ABS unit 9 are laid out easily behind the center cross member 4, and a mounting work of the devices can be performed easily, which will be described in detail later. Moreover, by positioning the front portion of the lumbar frame 5 as low as possible, the seat 21 is able to have a sufficient thickness, which allows the rider to ride the motorcycle comfortably.

—Structure of Rear Frame Portion—

Next, description will be given of a structure of a rear frame portion such as the lumbar frame 5 and the like coupled to the center cross member 4 as described above. In the present embodiment, as shown in FIG. 1, the lumbar frame 5 includes a pivot frame section 5c extending downward from the center cross member 4 and a rear stay section 5d (forward portion of the rear frame portion) extending rearward from the center cross member 4 such that the pivot frame section 5c and the rear stay section 5d are integral with each other. A front end portion of a rear end frame 6, which is a rear portion of the rear frame portion, is coupled to a rear end portion of the rear stay section 5d.

Figure 5:
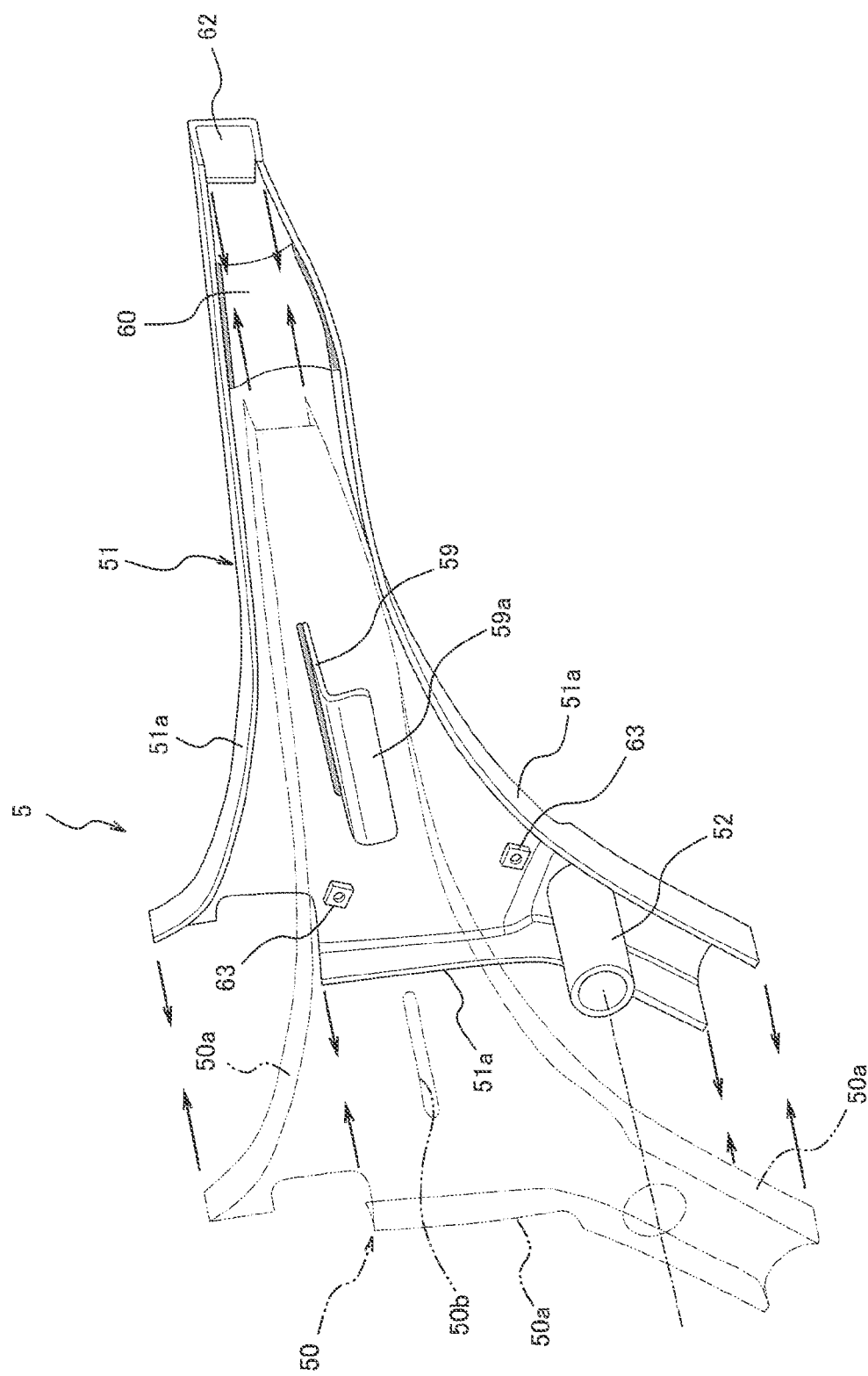
FIG. 5 is a perspective view showing an internal structure of the lumbar frame, from which a left steel plate is omitted.

As shown in FIGS. 1 and 5, an upper portion of a forward portion of the lumbar frame 5 has an inverted triangle shape which decreases its width in a downward direction when viewed from the side, and is tilted slightly forward in a downward direction, thus forming the pivot frame section 5c. The rear stay section 5d extends rearward in an obliquely upward direction from the inverted triangle portion. The inverted triangle portion is the forward portion of the rear stay section 5d and the upper portion of the pivot frame section 5c.

The pivot frame section 5c has a circular hole in an intermediate portion in a vertical direction; to be precise, a portion slightly under a center portion. A pivot support tube 52 constituted by a round pipe is inserted into this hole and welded thereto. A lower cross pipe 53 constituted by a round pipe is welded to a lower end portion of the pivot frame section 5c and protrudes in the rightward and leftward direction. A right end surface of the lower cross pipe 53 conforms in position to a right side surface of the center cross member 4. As described later, a pivot plate 96 (see FIG. 10) is joined to the right end surface of the lower cross pipe 53. A side stand bracket 54 is mounted to a left end of the lower cross pipe 53. A mount seat of the pivot plate 96 is provided on the side stand bracket 54.

A plate-shaped engine bracket 53a (see FIG. 9) extending forward is attached to a right portion of the lower cross pipe 53. A plate-shaped engine bracket 54a extending forward is attached to the side stand bracket 54. Like the engine brackets 46 and 47 of the center cross member 4, the engine brackets 53a and 54a are fastened at right and left sides to the transmission case. Muffler mounting brackets 55 are provided to extend rearward from the lower cross pipe 53 in a location corresponding to the right engine bracket 53a and in a location slightly rightward (inward in the vehicle width direction) relative to the left engine bracket 54a. The muffler mounting brackets 55 support a muffler in an exhaust system (not shown).

By comparison, as shown in FIG. 1, the rear stay section 5d extending rearward and obliquely upward from the inverted-triangle portion of the upper half portion of the lumbar frame 5 has a vertical width decreasing gradually in a rearward direction. This is because a base portion of the rear stay section 5d is able to have a higher stiffness to withstand a weight of the rider or the tandem rider which is applied from the seat 21 placed on an upper portion of the rear stay section 5d. As a result, a lower surface of the rear stay section 5d is curved gradually in a downward direction in the inverted-triangle portion at a forward side thereof and is continuous with a rear surface of the pivot frame section 5c.

As shown in FIG. 1, a seat support 56 is provided in the vicinity of a center portion in the forward and rearward direction in the upper surface of the lumbar frame 5 to support the seat 21 from below. The seat support 56 has an inverted-U shape formed by bending a steel plate. A left side plate of the seat support 56 is joined to a dented portion from a left side surface of the rear stay section 5*d* to an upper surface thereof. Below the seat support 56, a mount seat 57 for the canister 7 and a mount seat 58 for a battery 8 are provided.

As described above, the lumbar frame 5, including the pivot frame section 5*c* and the rear stay section 5*d*, which are integral with each other, has a closed cross-section structure in which the two press steel plates 50 and 51 are joined together from right and from left. To provide a space in which the devices are laid out, at right and left sides of the lumbar frame 5, as will be described later, the lumbar frame 5 is configured to have a width as small as possible while ensuring a high stiffness. In FIG. 5, the left steel plate 50 is indicated by an imaginary line and an interior of the right steel plate 51 is shown. The right steel plate 51 is provided with a flange 51*a* formed by bending the steel plate 51 inward, i.e., leftward in the vehicle width direction, on a substantially entire outer periphery of the right steel plate 51, i.e., a front edge of the pivot frame section 5*c*, a rear edge of the pivot frame section 5*c*, an upper edge of the rear stay section 5*d* and a lower edge of the rear stay section 5*d*.

Figure 6:
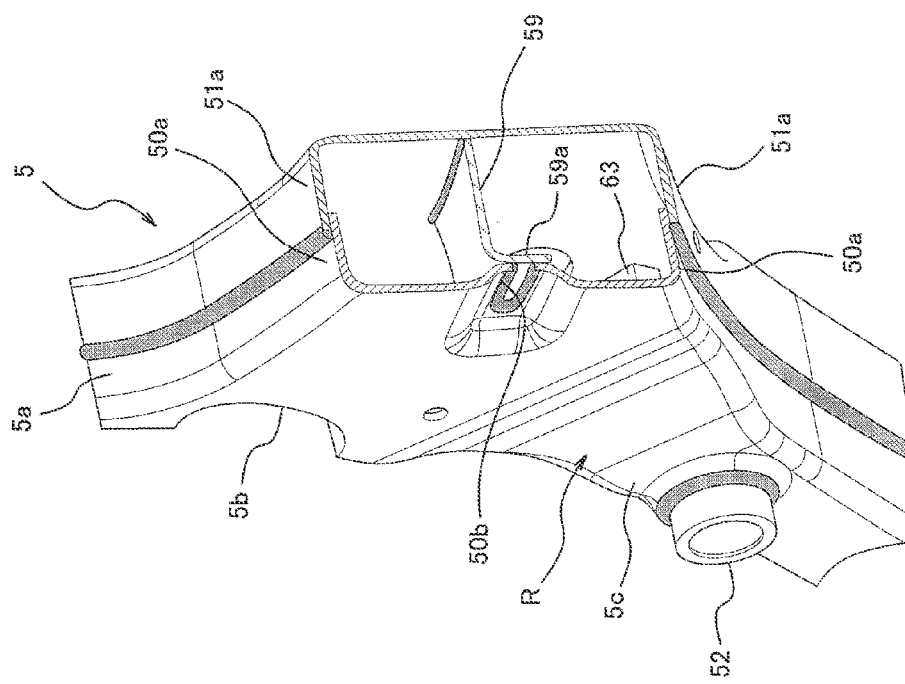
FIG. 6 is a perspective view showing a cross-section of the lumbar frame.
Figure 7:
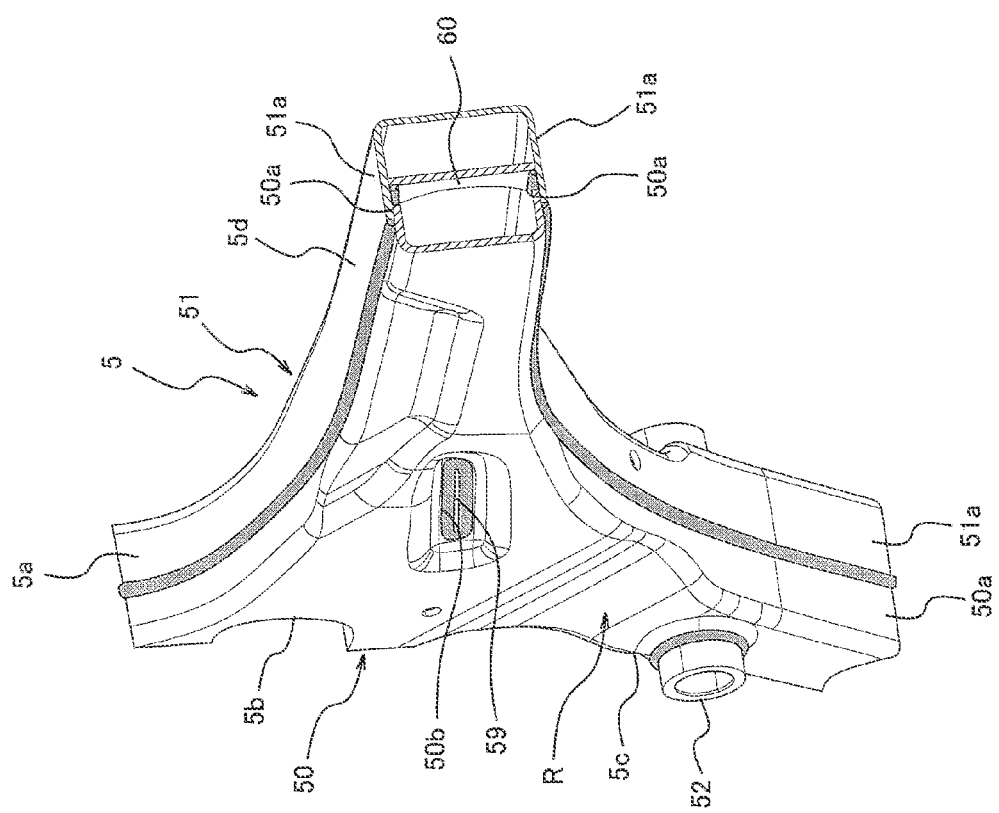
FIG. 7 is a perspective view showing another cross-section of the lumbar frame.

As indicated by imaginary lines in FIG. 5, the left steel plate 50 is provided with a flange 50*a* formed by bending an outer periphery of the left steel plate 50. An outer dimension of the left steel plate 50 is smaller than an outer dimension of the right steel plate 51. As shown in FIGS. 6 and 7, in a state where the left steel plate 50 and the right steel plate 51 are joined together in the rightward and leftward direction, the flange 51*a* of the right steel plate 51 is joined to an outer peripheral surface of the flange 50*a* of the left steel plate 50 from outside. The outer flange 51*a* is welded to the inner flange 50*a* substantially linearly along a periphery of the outer flange 51*a*.

Since the flanges 50*a* and 51*a* are joined together in the lumbar frame 5 as described above, each of a front surface of the pivot frame section 5*c*, an upper surface from an upper surface of the pivot frame section 5*c* to an upper surface of the rear stay section 5*d*, and a continuous surface from a rear surface of the pivot frame section 5*c* to a lower surface of the rear stay section 5*d* has a double-walled structure, to improve its stiffness. Since the surfaces are welded linearly along its lengthwise direction, the welding work is easy. In addition, the welding material melts well, and the external appearance of the welded portions is excellent. In particular, the upper surface applied with a lengthwise tensile stress due to a load from above has a sufficient weld strength which withstands a force for separating the welded portions from each other in the rightward and leftward direction.

The stiffness of the lumbar frame 5 having the closed cross-section structure can be adjusted depending on the thickness of the steel plates 50 and 51 instead of their cross-sectional areas and their cross-sectional shapes, or by providing a rib inside of the steel plates 50 and 51 as desired. For example, as shown in FIGS. 5 and 6, a rib 59 is provided on an upper portion of the inverted-triangle portion of the pivot frame section 5*c* such that the rib 59 extends in a direction in which the rear stay section 5*d* extends. The rib 59 couples the right and left steel plates 50 and 51 together to prevent the rear stay section 5*d* from getting twisted or from getting separated in the rightward and leftward direction.

The rib 59 is constituted by a plate member having a substantially rectangular shape elongated in the forward and rearward direction. A right edge of the plate member of the rib 59 is welded to a reverse surface of the right steel plate 51 (one of right and left plate members) such that the rib 59 protrudes leftward (toward the other side). The rib 59 has a bent portion 59*a* at a left end portion thereof by bending the plate member in a downward direction. The bent portion 59*a* is in contact with a reverse surface of a peripheral portion of the left steel plate 50 and is welded thereto to close an opening 50*b* formed in the left steel plate 50. In this structure, welding can be performed from an obverse surface side of the steel plate 50, i.e., from outside of the lumbar frame 5, through the opening 50*b*.

As shown in FIGS. 5 and 7, in a rear end portion of the rear stay section 5*d*, a rib 60 is provided to extend between the upper and lower flanges 51*a* of the right steel plate 51, and its upper edge and its lower edge are welded to the upper and lower flanges 51*a*, respectively. As shown in FIGS. 1 and 2, front end portions of right and left pipes 61 of the rear end frame 6 are welded to the rear end portion of the rear stay section 5*d*, corresponding to the rib 60. The rib 60 reinforces this portion to withstand the weight of the tandem rider. A lid portion 62 is provided at a rear end of the rear stay section 5*d* to close its opening, thus effectively reinforcing a cross-section of the rear end of the rear stay section 5*d*.

There is no change in an outer dimension of the lumbar frame 5, in a state where the lumbar frame 5 is added with the ribs 59 and 60 between the left steel plate 50 and the right steel plate 51 forming the closed cross-section. Therefore, as described later, the addition of the ribs 59 and 60 will not interfere with the space in which the devices are laid out. Since it is not necessary to add a reinforcement frame, the stiffness of the vehicle body of the motorcycle 1 can be improved as desired even in the middle of development of the motorcycle 1. This has a great advantage which is not achieved by the conventional pipe frame.

As shown in FIG. 5, nuts 63 are welded in desired locations to the reverse surface of the right steel plate 51 of the lumbar frame 5. As described later with reference to FIG. 9, bolts are threadingly engaged with the nuts 63 to mount an ABS unit 9 to the lumbar frame 5. The steel plate 51 is provided with circular holes (not shown) into which the bolts are inserted, to correspond to the circular holes of the nuts 63, respectively.

When viewed from above with reference to FIG. 2, the lumbar frame 5 has a shape in which a width in the rightward and leftward direction is very small. The lumbar frame 5 extends in the forward and rearward direction along a center line X of the vehicle body frame 1. At right and left sides of the lumbar frame 5, spaces in which the devices are laid out are provided. A front end portion of the lumbar frame 5 is located in a substantially center position in the rightward and leftward direction. As described later with reference to FIG. 9, the ABS unit 9 is positioned in the space at the right side of the front end portion of the lumbar frame 5. A portion of the lumbar frame 5 which is behind its front end portion is deviated slightly rightward. As described later with reference to FIG. 8, the canister 7 and the battery 8 are laid out in an increased space at the left side of the deviated portion of the lumbar frame 5.

As shown in FIGS. 6 and 7, the width of the lumbar frame 5 in the rightward and leftward direction is relatively great in a portion of the pivot frame section 5*c* which is under the pivot support tube 52. This portion has a square pipe portion in which a length in the forward and rearward direction is substantially equal to the width in the rightward and leftward direction. The pivot support tube 52 penetrates and is welded to an upper end portion of the square pipe portion. A lower end portion of the square pipe portion is welded to an outer periphery of the lower cross pipe 53. That is, a lower portion of the pivot frame section 5*c*, which is applied with a great force from the rear wheel via the swing arm 22, is firmly reinforced.

As shown in FIGS. 6 and 7, the lumbar frame 5 has a region R (shown in only FIGS. 6 and 7) in a location above the pivot support tube 52, which is a lower portion of the upper inverted-triangle shape and ⅓ of the upper inverted-triangle shape. The region R has a shape in which a length in the forward and rearward direction decreases gradually toward the pivot support tube 52 located below, and a width in the rightward and leftward direction increases gradually as the length decreases in a downward direction. Such a shape is intended to prevent a cross-sectional area of a horizontal cross-section of the pivot frame section 5*c* from changing rapidly in the vertical direction in order to provide stiffness.

In the portion above the region R having the shape in which the width in the rightward and leftward direction increases gradually, the left steel plate 50 is dented a little and the width of the lumbar frame 5 in the rightward and leftward direction is slightly reduced. However, the rib 59 is provided obliquely rearward relative to the dented portion and in close proximity to the dented portion, to provide sufficient stiffness. As described below, the dented portion is provided to correspond to a lower portion of the canister 7 laid out in the space at the left side of the lumbar frame 5, the lower portion slightly swelling rightward.

—Layout of Devices—

Figure 8:
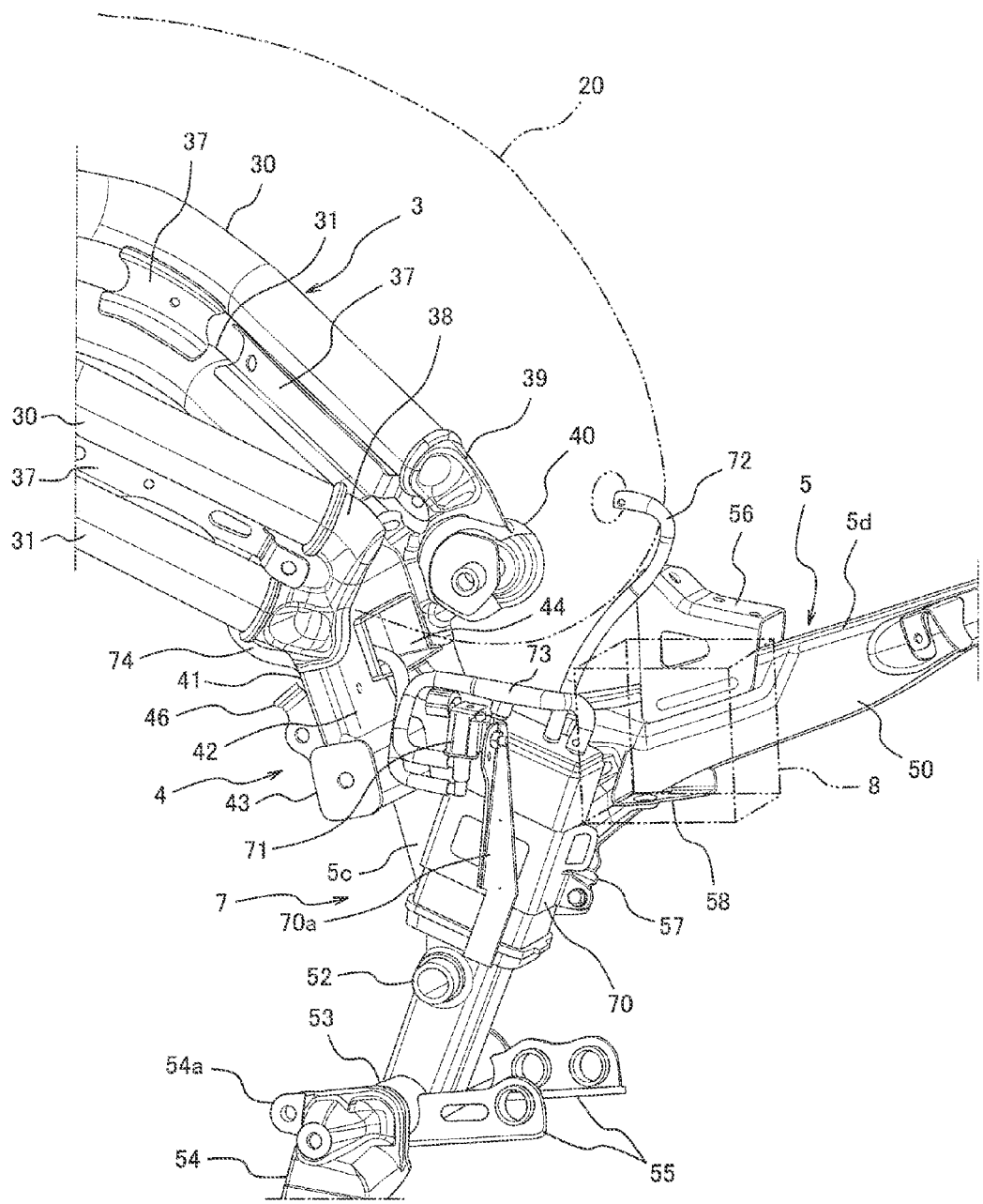
FIG. 8 is a perspective view showing a mounting state of a canister, and the like at a left side of the lumbar frame.

FIG. 8 shows a mounting structure of the canister 7 positioned at the left side of the lumbar frame 5, in an enlarged manner. As described above, the lumbar frame 5 is the reduced-width portion having the shape in which the width in the rightward and leftward direction is very small, in the overall vehicle body frame 1. In the lumbar frame 5, the portion above the pivot support tube 52 has a smaller width in the rightward and leftward direction than a square pipe portion located thereunder. The canister 7 is positioned to correspond to this reduced-width portion, to temporarily store an evaporative fuel and purge the evaporative fuel.

As shown in FIG. 8, the canister 7 of a substantially rectangular box shape is laid out such that its lower edge is closer to an upper side of the pivot support tube 52 (i.e., its lower edge is positioned as low as possible) and the canister 7 is tilted in a rearward direction to avoid interference with the wedge-shaped bracket 45 for reinforcing the portion where the lumbar frame 5 is joined to the center cross member 4. An upper surface of the canister 7 is located near the upper surface of the front portion of the lumbar frame 5. A side surface and a lower surface of the canister 7 are surrounded by a metal-made holder 70. The holder 70 is fastened to the mount seat 57 of the lumbar frame 5 by a bolt. The holder 70 is provided integrally with a support stay 70*a* for supporting a purge control valve 71 of the evaporative fuel.

An introduction hose 72 for introducing the evaporative fuel from the fuel tank 20 into the canister 7 and a suction hose 73 for suctioning the evaporative fuel adsorbed onto active carbon in the canister 7 outward to the purge control valve 71 are coupled to an upper surface of the canister 7. The purge control valve 71 is coupled with an air-intake system of the engine, for example, a guide hose 74 for feeding the evaporative fuel to, for example, a throttle body. The guide hose 74 is inserted into the reinforcement tube 44 penetrating a substantially center portion of the center cross member 4.

The hoses 71, 73 and 74 are applied with expensive fluorine coating. Since a rear end portion of the fuel tank 20 is positioned in close proximity to the canister 7 and immediately above the canister 7, the introduction hose 72 can be shortened in length, which results in reduced cost. In addition to the guide hose 74 of the evaporative fuel, a harness of CAN through which a control signal from an engine ECU is transmitted to the purge control valve 71, and through which a signal from a rear wheel vehicle speed sensor is transmitted to the engine ECU, a fuel hose, etc., are inserted into the reinforcement tube 44, although these are not shown.

When the canister 7 is mounted to the lumbar frame 5, the holder 70 and the purge control valve 71 are attached to the canister 7, and the hoses 71, 73, and 74 are coupled to the canister 7. An assembly of the canister 7 is temporarily placed in a predetermined location at the left side of the lumbar frame 5, and then the holder 70 is fastened to the mount seat 57 by a bolt. In this case, unlike as in the case of a conventional general pipe frame, pipes, stays and the like which will interfere with the canister 7 are not present in the vicinity of the space in which the canister 7 is laid out, and therefore the canister 7 can be easily mounted to the lumbar frame 5. In particular, since the mount seat 57 is provided on the left steel plate 50 of the lumbar frame 5, and the nut is welded to the mount seat 57, the bolt can be tightened more easily.

As indicated by an imaginary line in FIG. 8, the battery 8 is positioned behind the canister 7. The canister 7 is positioned in a forward region near the fuel tank 20 as described above, and the battery 8 is positioned behind and in close proximity to the canister 7. Unlike as in the case of the conventional general pipe frame, pipes, stays and others which will interfere with the battery 8, are not present, and therefore, the battery 8 can be positioned as low as possible such that the battery 8 does not interfere with the swing arm 22. In the example of FIG. 8, the battery 8 is placed on the mount seat 58 of an L-shape which is welded to a left side surface of the rear stay section 5*d* of the lumbar frame 5. When viewed from the side, the battery 8 is placed such that its rear portion is slightly higher to substantially overlap with the rear stay section 5*d* extending upward in a rearward direction. This layout is preferable, because a cushion of the seat 21 placed above the battery 8 is able to have a substantial thickness, which allows the rider and the tandem rider to ride the motorcycle comfortably.

Figure 9:
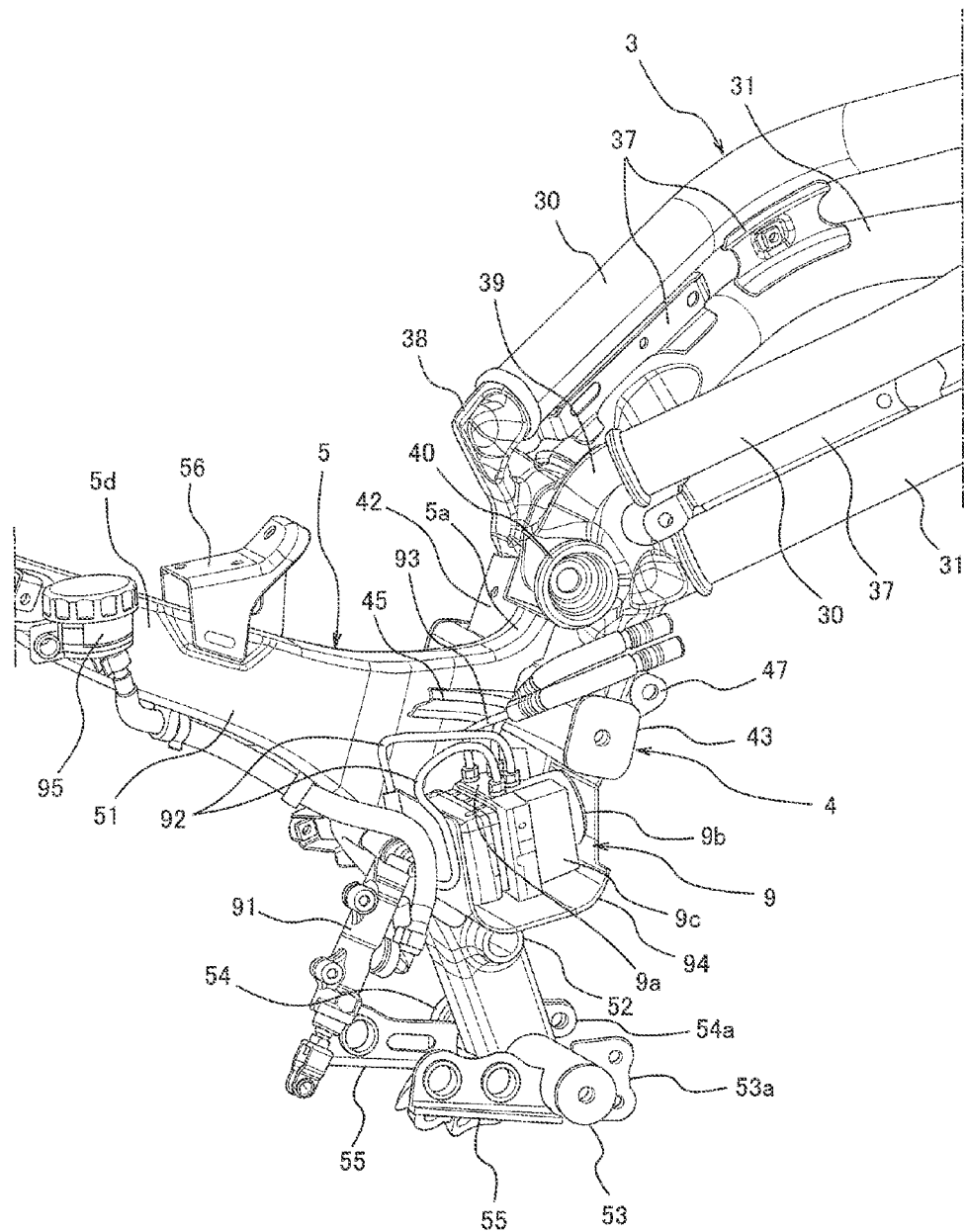
FIG. 9 is a perspective view showing a mounting state of an ABS unit at a right side of the lumbar frame.

FIG. 9 shows a state where the ABS unit 9 is laid out at the right side of the lumbar frame 5, in an enlarged manner, as in the case of FIG. 8. The ABS unit 9 is intended for ABS (anti-lock brake system) control in which, for example, a hydraulic brake pressure is reduced, to inhibit the wheels from being locked. In the example of FIG. 9, a valve block 9*a* including a plurality of electromagnetic valves integrated together, a pump for increasing the hydraulic brake pressure, a drive motor 9*b* for actuating the pump, an ECU unit 9*c* for controlling the valve block 9*a*, the pump, and the drive motor 9*b*, and the like, are unitarily coupled together.

Like the canister 7 at the right side of the lumbar frame 5, the ABS unit 9 is mounted to the pivot frame section 5*c* of the lumbar frame 5 such that the ABS unit 9 is positioned above and in close proximity to the pivot support tube 52, i.e., as low as possible. The ABS unit 9 is attached with a small projection (not shown) protruding upward along its left side surface (side surface at a far side in FIG. 9). The ABS unit 9 is fastened to a right side surface of the lumbar frame 5 by a bolt penetrating the projection.

A master cylinder 91 of a foot brake is positioned at a right side of the pivot frame section 5*c*. Since the ABS unit 9 is in close proximity to the master cylinder 91, brake pipes 92 coupling them together are short in length. The brake pipes 92 are coupled to an upper surface of the valve block 9*a*. Brake pipes 93 are laid out in the vicinity of the brake pipes 92 and are connected to a brake lever of the motorcycle or a wheel cylinder of a front wheel. Unlike as in the case of the conventional general pipe frame, the brake pipes 93 need not be drawn to outside of the pipes and the like, and are short in length. This has an advantage of cost reduction.

A shield plate 94 is provided to surround the ABS unit 9 from three sides, which are a front surface of the ABS unit 9, a lower surface of the ABS unit 9, and a rear surface of the ABS unit 9, except for the upper surface to which the brake pipes 92 and 93 are attached. The shield plate 94 is formed by bending, for example, a rubber-made plate member. The shield plate 94 blocks heat radiated from the engine located forward, and protects the ABS unit 9 from water, mud, or stones, from forward or from below. A socket of the ECU 9c is provided on a right side surface of the ABS unit 9. The harnesses through which signals are transmitted and received between vehicle speed sensors of the front wheel and the rear wheel, and the engine ECU, are inserted into the socket.

The pivot plate 96 (see FIG. 10) is mounted from a right side to cover the harnesses. As a result, the ABS unit 9 is surrounded from all directions, except for from above. The pivot plate 96 covers pivot structure elements and the like, for supporting a front end portion of the swing arm 22. Therefore, a design cover is not required to cover the ABS unit 9 and the like. In FIG. 9, reference number 95 designates a reserve tank of a brake fluid which is coupled to the master cylinder 91. A lid which is opened to fill the brake fluid for refill is attached on an upper portion of the reserve tank.

Like the above stated canister 7, the ABS unit 9 can be easily mounted to the lumbar frame 5 from laterally. In this case, unlike as in the case of the conventional general pipe frame, the pipes and the like of the vehicle body frame will not interfere with a mounting work of the ABS unit 9. An operator positions the ABS unit 9 within the shield plate 94, from the right side of the lumbar frame 5, aligns the circular holes of the projections with respect to the circular holes of the right steel plate 51 of the lumbar frame 5, inserts the bolts into these holes, and threadingly engages the bolts with the nuts 63 (see FIG. 5) welded to the reverse surface of the steel plate 51.

Figure 10:
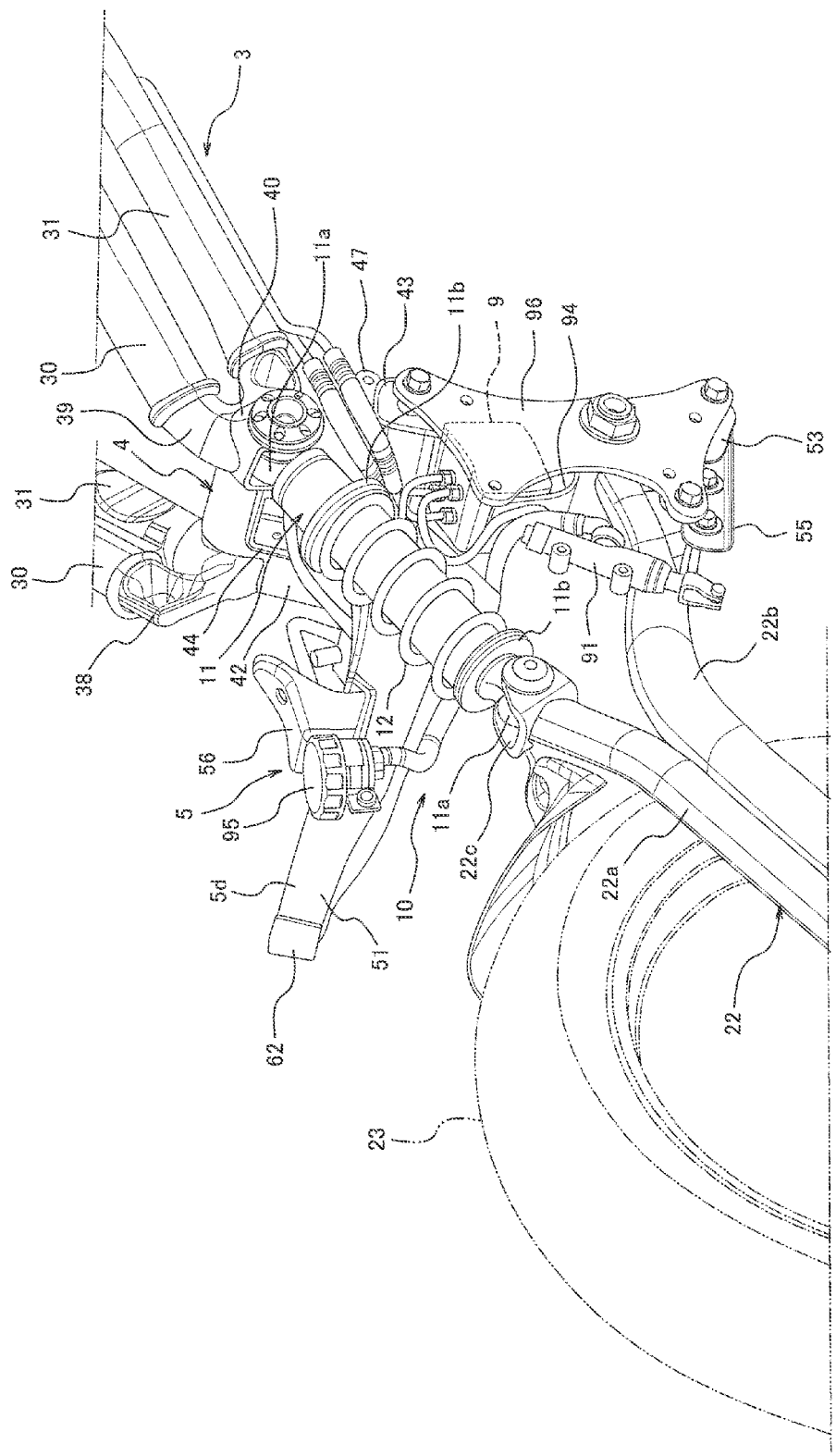
FIG. 10 is a perspective view showing a mounting state of a suspension unit at the right side of the lumbar frame.

As shown in FIG. 10, a suspension unit 10 is positioned above the ABS unit 9. As shown in only FIG. 10, the swing arm 22 for supporting the rear wheel 23 (indicated by imaginary lines) is constituted by a pair of upper and lower round pipes 22a and 22b like the main frame 3 of the vehicle body. A front end portion of the lower round pipe 22b is supported by a shaft inserted into the pivot support tube 52, while a support portion 22c is provided at a front end portion of the upper round pipe 22a to support a lower end of the suspension unit 10.

In the suspension unit 10, a substantially cylindrical oil damper 11 is provided with ring-shaped coupling portions 11a at upper and lower ends, and receivers 11b of a coil spring 12 which are welded to outer peripheries of the upper and lower ends of the oil damper 11, respectively. The coil spring 12 is wound around an outer periphery of the oil damper 11 such that the coil spring 12 is apart from the oil damper 11. The coil spring 12 is compressed preliminarily in a state where both ends of the spring 12 are in contact with the receivers 11b, respectively.

The suspension unit 10 is located a predetermined distance above the ABS unit 9 such that the suspension unit 10 extends in the forward and rearward direction and is tilted upward in a forward direction. The coupling portion 11a at the upper end of the suspension unit 10 is rotatably supported by a suspension support unit 40 at a rear end of the main frame 3. To be specific, the ring-shaped coupling portion 11a at the upper end of the oil damper 11 is rotatably coupled by a coupling shaft piercing a left support plate 40a and a right support plate 40b of the suspension support unit 40 in a state where the coupling portion 11a is sandwiched between the left support plate 40a and the right support plate 40b. In the same manner, the coupling portion 11a at the lower end portion of the suspension unit 10 is rotatably coupled to the support portion 22c at a front end of the swing arm 22.

In the present embodiment, the suspension unit 10 is positioned such that it is deviated rightward from the lumbar frame 5 extending through a substantially center portion of the vehicle body. As shown in FIG. 10, the layout of the suspension unit 10 allows the main frame 3 extending downward in a rearward direction to be smoothly continuous with the swing arm 22 behind the main frame 3. Thus, an external appearance of the motorcycle is enhanced.

In the vehicle body frame 1 of the motorcycle as described above, the main frame 3 of the front frame portion to which the engine and the transmission are mounted includes a pair of right and left frame members (upper and lower main pipes 30 and 31) as in a conventional configuration, but a relatively forward portion of the rear frame portion, which is continuous with the rear portion of the main frame 3, is constituted by the lumbar frame 5 extending through a substantially center portion of the vehicle body and having a small width in the rightward and leftward direction. In lateral spaces of the lumbar frame 5, the devices such as the canister 7, the ABS unit 9, and the like are laid out, and are easily mounted to the vehicle body frame 1 from the right side and from the left side.

As described above, the lumbar frame 5 having a small width in the rightward and leftward direction has the closed cross-section structure in which the press-formed steel plates 50 and 51 are joined together from the right and from the left. The lumbar frame 5 can have an appropriate cross-sectional coefficient by setting its shape or the like. By adding the ribs 59 and 60 and the like to inside of the press steel plates 50 and 51 as desired, the lumbar frame 5 can have a sufficient stiffness regardless of its small width. The vehicle body frame 1 can reduce cost and achieve a good weld property as compared to a vehicle body frame of a pipe work. Thus, the vehicle body frame 1 has an advantage in stiffness.

Since the pivot frame section 5c and the rear stay section 5d are integral with each other, in the present embodiment, the left and right steel plates 50 and 51 constituting the lumbar frame 5 having the closed cross-section structure can be integrally molded by pressing or the like. This has an advantage of reduction of manufacturing cost. When the steel plates 50 and 51 are press-formed, the mount seats are provided on the steel plates 50 and 51, and the nuts and the like are welded to the reverse surfaces of the steel plates 50 and 51. This makes it easier to mount the devices to the vehicle body frame 1.

Furthermore, in the present embodiment, the center cross member 4 coupling the rear ends of the right and left frame members of the main frame 3 has the closed cross-section structure in which the steel plates 41 and 42 are joined together in the forward and rearward direction. Therefore, the center cross member 4 has a stiffness equal to or higher than that of the vehicle body frame of the conventional general pipe work, while achieving low cost and space saving. This has an advantage that the devices are laid out and mounted easily. Moreover, the rear end portion of the fuel tank 20 is positioned in a space from a location above the center cross member 4 to a location behind the center cross member 4, and is behind and below a rear portion of a fuel tank positioned with respect to the conventional vehicle body frame. This makes it possible to achieve a good weight balance of the vehicle.

The lumbar frame 5 is welded to the rear surface of the steel plate 42 and to the square pipe 43 in the center cross member 4, from behind, the upward protruding portion 5a at the front end of the lumbar frame 5 is welded to the reinforcement tube 44 of the center cross member 4, and the wedge-shaped bracket 45 is provided between the lumbar frame 5 and the square pipe 43, thereby enhancing a joint stiffness. Further, the center cross member 4 is provided with the engine brackets 46 and 47 and the pivot frame section 5c of the lumbar frame 5 is provided with the engine brackets 53a and 54a so that the center cross member 4 and the lumbar frame 5 are joined together with an improved stiffness by joining them to the engine case.

In the continuous spaces at the right side and at the left side of the lumbar frame 5, having small width in the rightward an leftward direction, behind the center cross member 4, the plurality of devices can be laid out without wasted space according to the sizes and shapes of the devices. To be specific, the ABS unit is positioned in a lower location, at the right side of the lumbar frame 5, and the suspension unit 10 is positioned above the ABS unit, while the canister 7 is positioned near the fuel tank 20 at the left side of the lumbar frame 5, and the battery 8 is positioned behind the canister 7 as low as possible.

That is, the layout of all of the canister 7, the battery 8, the ABS unit 9, and the suspension unit 10 in the vicinity of the lumbar frame 5 is optimized, and the vehicle width does not increase substantially, even though many devices are laid out in the vicinity of the seat 21. Therefore, the leg portions of the rider fit the seat 21 well, and the rider can attain unity with the motorcycle. The rider can ride the motorcycle more comfortably, and can rest feet on the ground more comfortably.

Other Embodiments

The above embodiment is merely exemplary, and is in no way intended to limit the present invention, its applications and uses. Any change, addition, or deletion may be made for the mounting structure of the devices of the present invention, without departing the spirit of the present invention.

In the present embodiment, for example, the pivot frame section 5c and the rear stay section 5d are integral with each other to form the lumbar frame 5 having the closed cross-section structure in the rear portion of the vehicle body frame 1. However, the present invention is not limited to this, and only either one of the pivot frame section 5c and the rear stay section 5d may have the closed cross-section structure and may be welded to the center cross member 4.

In the present embodiment, both of the center cross member 4 and the lumbar frame 5 have the closed cross-section structures. However, the center cross member 4 need not have the closed cross-section structure, but may have a structure of the conventional pipe work. The engine brackets may be omitted from the center cross member 4.

Although in the present embodiment, the canister 7, the battery 8, the ABS unit 9, and the suspension unit 10 are illustrated as the devices incorporated into the motorcycle, the devices are not limited to these, but may be, for example, a GPS unit, a relay box, a regulator, an ECU, or the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle body frame of a motorcycle comprising:
a front frame portion extending rearward from a head pipe; and
a rear frame portion extending rearward from a rear end of the front frame portion;
wherein the front frame portion includes a pair of right and left frame members;
wherein a forward portion of the rear frame portion includes a closed cross-section structure portion including right and left plate members joined together in a rightward and leftward direction;
rear ends of the right and left frame members of the front frame portion are coupled together by a cross member;
the rear frame portion includes a pivot frame section extending downward from the rear end of the front frame portion, and the closed cross-section structure portion at an upper side of the pivot frame section is welded to the cross member; and
the cross member and the pivot frame section are provided with engine brackets, respectively;
wherein the right and left frame members of the front frame portion are provided with down frame sections extending downward from forward portions of the right and left frame members, respectively, the down frame sections supporting a front portion of an engine at right and left sides; and
each of the right and left down frame sections has a closed cross-section structure portion including plate members joined together in the rightward and leftward direction.

* * * * *